United States Patent [19]

McGann et al.

[11] Patent Number: 5,563,611
[45] Date of Patent: Oct. 8, 1996

[54] METHOD OF AND APPARATUS FOR INTEGRATION OF LORAN-C AND SATELLITE NAVIGATION SYSTEM (SNS) TECHNOLOGIES FOR IMPROVED SYSTEM ACCURACY, AVAILABILITY AND INTEGRITY

[75] Inventors: Edward McGann, Andover; William Roland, Westford, both of Mass.

[73] Assignee: Megapulse, Inc., Bedford, Mass.

[21] Appl. No.: 330,969

[22] Filed: Oct. 28, 1994

[51] Int. Cl.⁶ .................................................. G01S 1/24
[52] U.S. Cl. ....................... 342/389; 342/357; 342/352
[58] Field of Search .................................. 342/389, 357, 342/352, 388

[56] References Cited

U.S. PATENT DOCUMENTS 4,894,655  1/1990  Joguet et al. .......................... 340/998
5,119,341  6/1992  Youngberg .............................. 367/5
5,278,568  1/1994  Enge et al. ............................ 342/367
5,367,306  11/1994  Hollon et al. ......................... 342/386

Primary Examiner—Thomas H. Tarcza
Assistant Examiner—Dao L. Phan
Attorney, Agent, or Firm—Rines and Rines

[57] ABSTRACT

A method of apparatus for integrating Loran-C and satellite navigation system technologies in a manner in which the Loran-C navigation signal transmissions are further modulated to provide a communications signal and a supplemental navigation signal, timed to provide additional position information, and used to smooth user position and velocity data between augmentation data messages and between adding and deleting or losing satellite contributing signals.

15 Claims, 2 Drawing Sheets

METHOD OF AND APPARATUS FOR INTEGRATION OF LORAN-C AND SATELLITE NAVIGATION SYSTEM (SNS) TECHNOLOGIES FOR IMPROVED SYSTEM ACCURACY, AVAILABILITY AND INTEGRITY

The present invention relates to radio navigation systems, being more particularly directed to the improvement of radio navigation information from satellite navigation systems (SNS), presently exclusively available in the form of the American global positioning system, GPS, through employment of Loran-C navigation systems for providing a communications signal and a supplemental navigation signal, timed to provide additional position information, and used to smooth user position and velocity data between augmentation data messages, and between adding and deleting or losing satellite contributing signals to or from the user position and velocity solution.

BACKGROUND

Satellite navigation systems provide a very attractive service for their global coverage and accuracy; but the accuracy is not sufficient for the safety of all useage applications, such as vessels in the harbor environment and aircraft during approach and landing. Position accuracy is limited by the ability of the satellites to provide correct and timely information on the satellite clock offset, orbital parameters, and propagation conditions. Satellites, furthermore, are not continuously monitored and in communications range of their terrestrial control center, and therefore do not provide sufficient integrity to notify users of malfunctions in a timely manner. Other limitations of concern are the availability of the minimum number of satellites needed for a fix, the orientation of satellites and the resulting geometric dilution of precision (GDOP), and the discontinuities associated with changing tracked satellites as they enter and exit the users' field of view.

GPS augmentation has accordingly been proposed for providing a communications channel to GPS users and transmitting data to improve the accuracy and integrity of the GPS, and may also include supplemental navigation service to improve availability and decrease discontinuities through timing relationships in the communications channel. An augmentation system for the provision of data to improve accuracy and integrity only is called Differential GPS (DGPS).

Two generic methods of such augmentation have been propsed in the literature and demonstrated (see, for example, the following articles; Johnson, G. "Results and Performance of Multi-Site Reference Station Differential GPS", Radice, J. T. & Wilson, R. "Standards For Maritime DGPS Reference Stations and Integrity Monitors, and Barboux, Jean-Pierre "An Assessment of Differential GPS Performance With Respect To User-Reference Separation", a Inst. of Navigation, Proceedings of 1993 GPS Meeting Sep. 22–24, 1994; and Alsip, Douglas H. CDR, et al "The Coast Guard's Differential GPS Program" Institute of Navigation, Proceedings of 48th Annual Meeting 29 June to 01 July 1994).

1) 'Wide Area Augmentation' provides the user with data on each satellite clock offset, orbital parameters, and propagation conditions. This technique uses a specialized communications system to send data from multiple remote GPS monitor receivers to a central data processing facility. The central facility determines all of the various corrections for each satellite in view, and then sends the resulting messages over the specialized communications system to additional communications facilities for transmission to the users (a satellite link is proposed). The central facility also monitors the remote monitor sites for proper operation; and (2) 'Local Area Augmentation' which provides the user with data on pseudo-range corrections for each satellite in view of each of the multiple remote GPS monitor receiver sites, and then communicates directly from the monitor receiver sites (or nearby communications sites) to the users. Psuedo-range corrections combine all correction factors in a single term. The monitor sites are monitored both by internal checks and by a central facility for proper operation.

Either method can provide accuracies of the order of 5 meters or better; but there may be some degradation of local area augmentation beyond about 500 nm, as against the longer delays in the wide area augmentation system providing integrity messages and its lower communications reliability due to the multiple steps required in communications.

A much improved technique, in accordance with the present invention, is to use the Loran-C technology to augment SNS or GPS. Loran-C augmented GPS may also be either local area augmentation or wide are augmentation. In either case, the Loran-C signal is used as a communications signal and a supplemental navigation signal, timed to provide additional position information, and used to smooth user position and velocity data between augmentation data messages, and between adding and deleting satellites available to the user position and velocity solution. It is intended, but not always necessary, that a GPS monitor receiver be located at the Loran-C station.

OBJECTS OF INVENTION

An object of the present invention, accordingly, is to provide a new and improved method of and apparatus for integrating Loran-C and satellite navigation system technologies for improved system accuracy, availability and integrity.

Other and further objects will be explained hereinafter and are more particularly delineated in the appended claims.

SUMMARY

In summary, however, from one of its broader viewpoints, the invention embraces, in a satellite navigation system having a plurality of satellite transmitting navigation signals to ground user receivers and also communicating augmenting data messages to improve the accuracy and integrity of the navigation signals, a method that comprises, at each ground receiver, receiving also Loran-C navigation signals, and integrating the received augmented satellite navigation signals and messages with the received Loran-C signals to use the Loran-C signals as a communications signal and a supplemental navigation signal; timing the Loran-C signals to provide position information additional to that of the satellite navigation signals and to smooth user position and velocity data between the satellite signal augmentation data messages and between the added and deleted satellites communication available to the user receiver position and velocity determination.

Preferred and best mode techniques and apparatus designs and congfigurations are later presented.

DRAWINGS

The invention will now be described in connection with the accompanying drawings, FIG. 1 of which is a block diagram of a Loran-C transmitter station interacting with local GPS receiver information as for the later-described "Eurofix" system;

DESCRIPTION OF PREFERRED EMBODIMENTS OF INVENTION

While cooperation between satellite and Loran-C navigation uses as a hybrid world wide system has been proposed in, for example, an article by Dr. Durk van Willigen and L. J. Beckhus entitled "Eurofix", appearing in Inst. of Navigation, Proceedings of 1993 GPS meeting Sep. 22–24, 1994, a much closer integration and interplay, particularly involving satellite augmentation techniques, underlies the method of the present invention.

Figure 1:
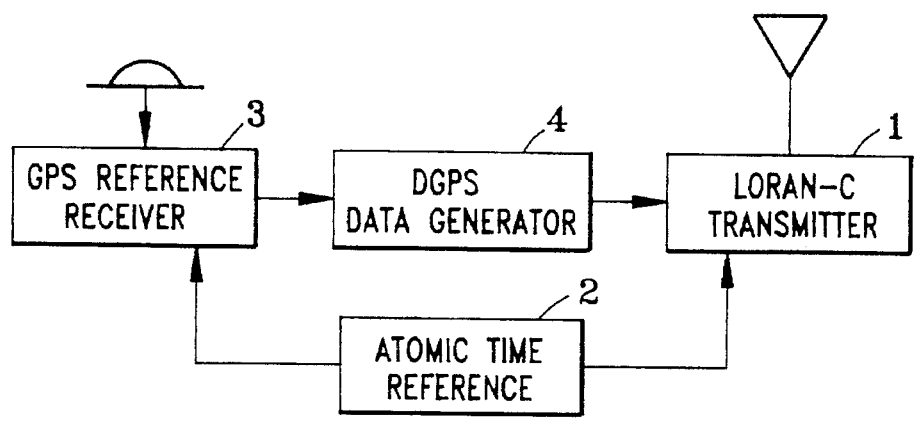
Figure 2:
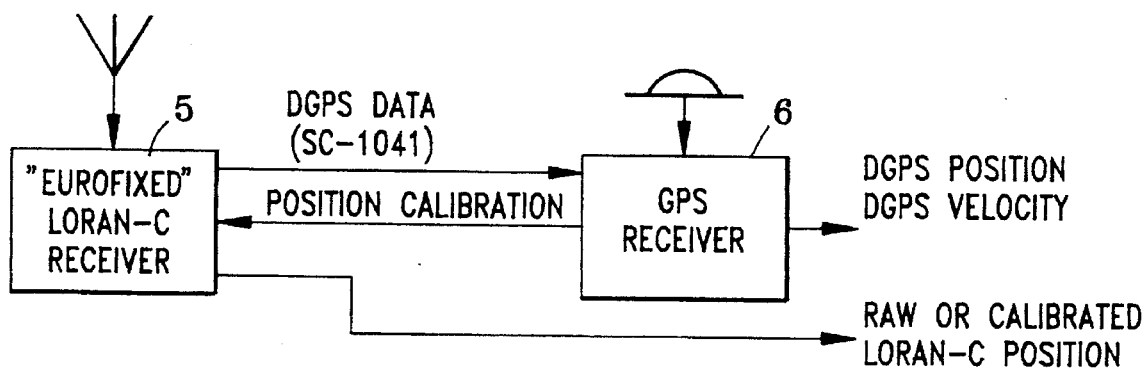
FIG. 2 is a similar diagram of ground or other user receiver apparatus for the Loran-C transmissions of FIG. 1.

In FIG. 1, a Loran-C transmitter 1 is shown controlled under atomic clock (cesium) timing synchronization at 2, by satellite (GPS) reference signals received locally at the Loran-C transmitter station at 3, as corrected by differential GPS data at 4 (DGPS). Suitable transmitters are those described, for example, in U.S. Pat. Nos. 3,711,725, 3,889, 263, 4,001,598, 4,151,528, and 4,423,419 of common assignee herewith.

The Loran-C station is particularly suited to be in the site of a differential GPS monitor receiver. The station is designed with the very high reliability power system need to ensure reliable station operation as a radionavigation transmitter site. Further, navigation system technicians are trained and assigned to respond quickly to equipment service needs such a station. Thus, a relatively minor increase in the Loran-C station power load and work load will not substantially affect the cost of manning and operating the site, while providing the best possible reliability.

Further to the technical capability of the site, the presence of triply rebundant cesium frequency standards on the station provides additional synergy in its use as a differential GPS monitor receiver site. The cesium standard permits accurate and fast determination of GPS integrity, and ensures that the differential GPS base station clock offset remains constant over a relatively long (1000's of seconds) time period. This in turn permits the use of differential GPS corrections which are measured at different times, and substantially improves the performance of the DGPS system which uses asynchronous transmission of correction data. Again, this improves the system performance when data bit errors occur, or with slow communications channel.

At the user ground (or other) receiver end, the "Eurofixed" Loran-C transmissions at 5 receive position calibration from a local GPS receiver 6, connected by the DGPS data carried on the Loran-C transmission. This results in DGPS position and velocity outputs of the receiver 6, and raw or calibrated Loran-C position data from the Loran-C receiver 5. Suitable receivers are those decribed, for example, in U.S. Pat. Nos. 3,736,590, 3,774,210, 3,921,076, 4,392,138 and 4,482,896.

Figure 3:
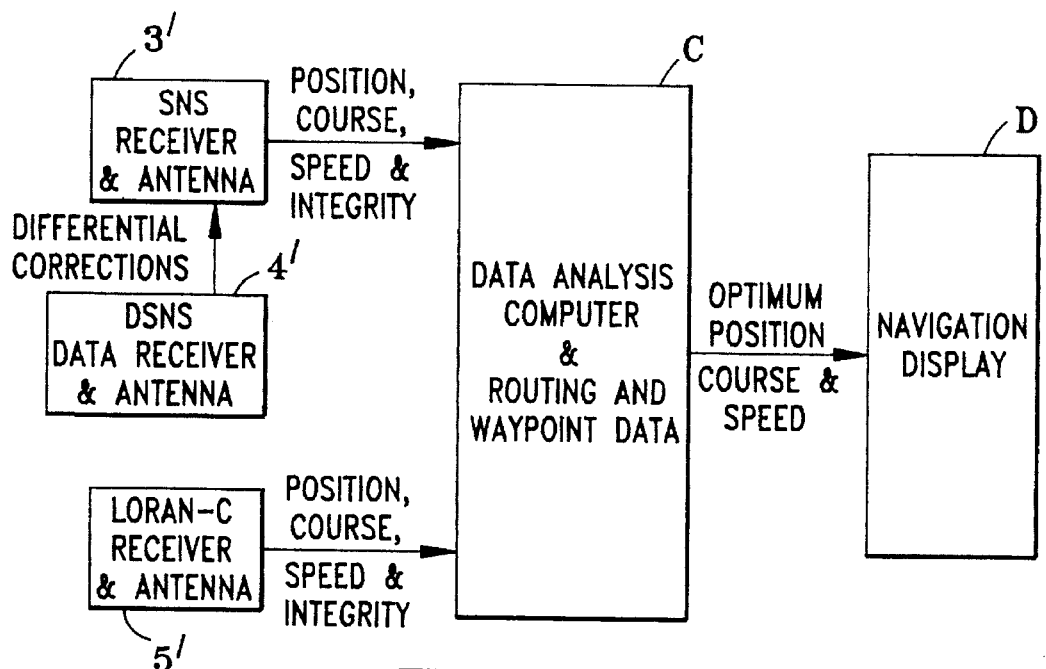
FIG. 3 is a block diagram of integrated Loran-C and satellite navigation received signals in accordance with a separate fix mode of operation of the present invention.

Turning to the preferred user receiver-end implementations of the present invention, separate satellite navigation signal and Loran-C navigation signal fixes may be used for a new degree of integration and accuracy in the embodiment of the invention shown in FIG. 3. The satellite navigation system SNS receiver 3', such as a GPS receiver, is shown provided with differential corrections from a differential satellite navigation system data receiver 4' as described, for example, in the previously cited DGPS articles. A local Loran-C receiver 5' provides its independent position, course, speed and integrity as is well known and described, in the above-referenced patents and in, for example, Gunther, G. T, "The Potential of Loran-C Stations As CNSS Monitoring Sites", Inst. of Navigation Proceedings, National Technical Meeting Jan. 20–22, 1993. A particularly suitable Loran-C receiver is the Type "Acufix" of the assignee of the present application. This Loran-C information is shown applied to a data analysis computer, such those used in the above citations, combined together with the independently desired position, course, speed and integrity data of the GPS or other SNS recevier 3', as of the types described in the above-cited articles. From the computer C will result the optimum position, course and speed information for display to the ground (or other) user at D.

This so-called Type I configuration of FIG. 3 involves augmentation by Loran-C, and provides a most useful supplemental navigation signal. The Loran-C grid is known to have offsets associated with the uncertainties of LF propagation over land. The uncertainties degrade the geographic accuracy of horizontal position data derived from Loran-C signals. The Loran-C gradients, however, useful in determining velocity or change of position in local areas, are extremely stable over relatively short periods of time (hours). Therefore, change of position can be measured very precisely. The augmentation of the GPS by Loran-C therefore provides the combination of the very precise accuracy of the GPS at 3' which can calibrate the Loran-C grid, as before explained, with the very precise change of position and velocity determination by Loran-C at 5'. Using Loran-C between DGPS fixes (or, more generally, DSNS fixes) permits longer delays in receiving differential correction signals such as might be caused by data bit errors or a slow communications channel, and allows the user to ride through periods of GPS outages caused by failed satellite, interference, or unavailability of sufficient satellites with appropriate geometry.

Figure 4:
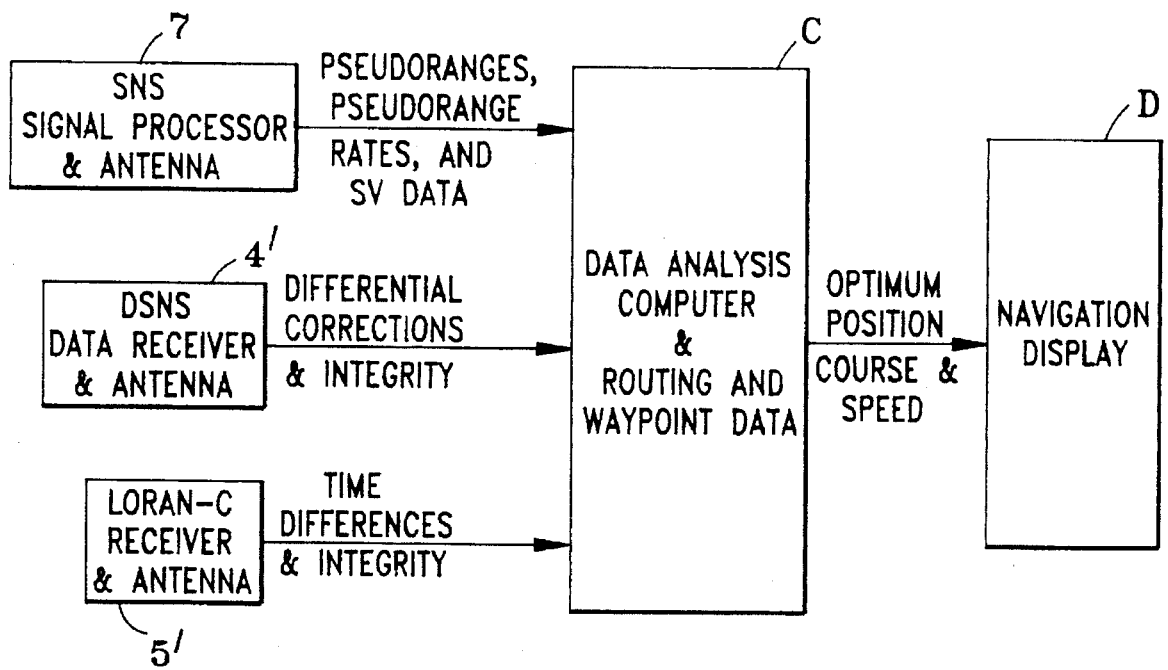
FIGS. 4 and 5 are similar diagrams of SNS pseudorange and Loran-C time difference integration under the principles of the invention, and SNS pseudorange and Loran-C times-of-arrival (pseudorange) integration, respectively.

In the operational mode of the invention shown in FIG. 4 (Type II), the differential GPS (or SNS) receiver 4' separately inputs the analysis computer C together with the before-described psuedorange and psuedorange rate and satellite velocity (SV) data derived by signal processing the SNS received signals at 7, and time difference and integrity information from the Loran-C receiver 5'.

Figure 5:
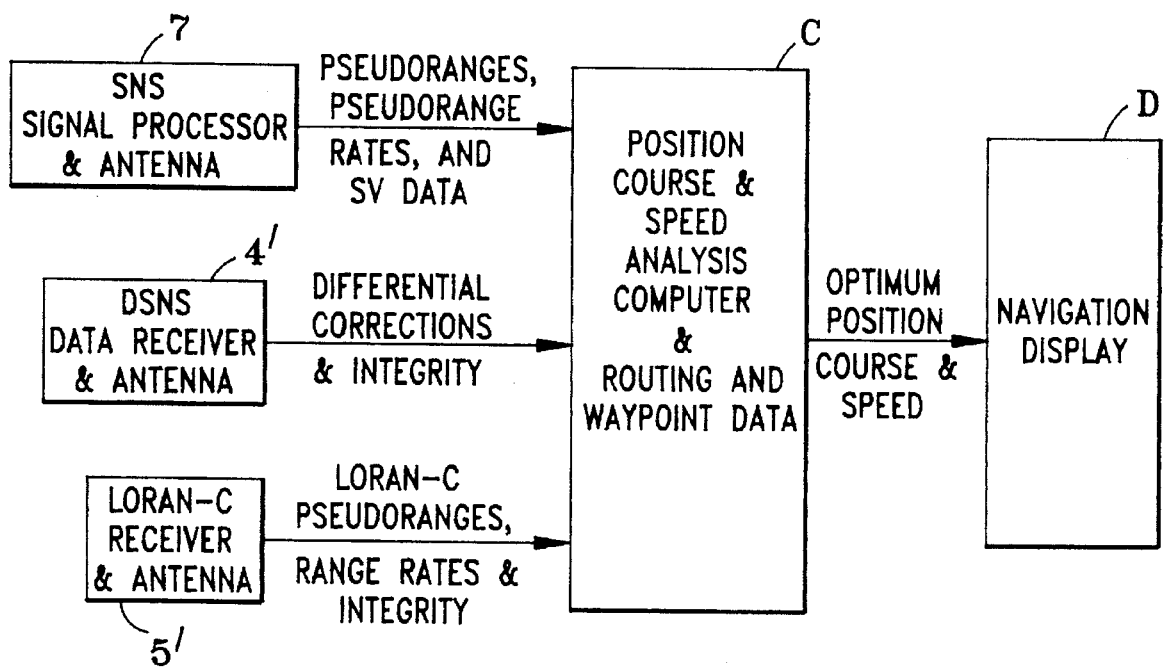

In the "Type III" mode of the invention, FIG. 5, the Loran-C receiver outputs time difference and integrity information, combining SNS pseudoranges with Loran-C time differences.

With regard to augmentation of the communications channel using the Loran-C navigation signal, the use of the Loran-C navigation signal to provide a communications channel has been previously accomplished using pulse position modulation in the transmitter 1, FIG. 1, to represent data bits, as described, for example, in U.S. Pat. Nos. 4,821,038 and 4,800,391 of the present assignee, with no discernible degradation of the navigation service. Theoretically, the modulation could have caused 1.75 db reduction in Loran-C system signal to noise ratio. In the Loran-C navigation system which is designed for a typical 30 db variation of atmospheric noise, however, the reduction is insignificant.

Elimination of offsets of the measured Loran-C signal carrier phase are accomplished by coding to ensure an equal number of pulse position advance and retard bits, as described in the above patents. Clearly, however, other techniques for modulating the Loran-C radio-frequency pulse transmission may also be used besides pulse position modulation, including phase code flips, alone or in combination with pulse position modulation, or other signal formats such as adding an extra pulse(s), the presence or absence of which may constitute the message—all however, without interfering with the accuracy of the navigation signals.

The "Eurofix"/Loran augmented GPS, involving GPS differential corrections and integrity messages distributed to users via modulation on Loran-C navigation signals, provides the advantages of meeting many of the critical requirements of the multimodel user community including air-enroute and terminal flight non-precision landings, marine-harbor and harbor entrance navigation, or land-vehicle location to a small part of a city block, for example. The invention utilizes Loran-C transmitting stations as DGPS monitor sites and makes full use of the Loran-C system infrastructure—land, building, electric power, communications, precise clocks and personnel. Service areas are large—up to 600 km or more from any Loran-C transmitting site. All the necessary sub-systems for implementation of the invention are currently available and well proven, so that near-term implementation is possible; such implementation being inexpensive both for users and service providers. No new radio spectrum allocations are required, as distingushed with the use of separate frequencies for each user community, and the Loran-C/DGPS correction and integrity messages are under the control of local authorities. Users, moreover, have a high level of safety with multiple levels of capability— GPS or Loran-C; integrated GPS/Loran-C; "Eurofix" with integrated GPS/Loran-C plus DGPS corrections and Loran-C calibrated by corrected GPS.

Further modifications will occur to those skilled in this art, and such are considered to fall within the spirit and scope of the invention as defined in the appendned claims.

What is claimed is:

1. In a satellite navigation system having a plurality of satellite transmitting radio navigation signals to ground user receivers and also communicating augmenting data messages to improve the accuracy and integrity of the navigation signals, a method, that comprises, at each ground receiver, receiving also Loran-C radio navigation signals, and integrating the received augmented satellite navigation signals and messages with the received Loran-C signals to use the Loran-C signals as a communications signal and a supplemental navigation signal; timing the Loran-C signals to provide position information additional to that of the satellite navigation signals and to smooth user position and velocity data between any satellite signal augmentation data messages and between any added and deleted satellites communication available to the user receiver position and velocity determination.

2. A method as claimed in claim 1 and in which the further steps are performed of differentially correcting the user received satellite navigation signals to produce improved position, course, speed and integrity information; deriving from the Loran-C received signals a separate fix of position, course, speed and integrity information; and analyzing and combining all the received information to obtain an optimum position, course and speed determination.

3. A method as claimed in claim 1 and in which the further steps are performed of differentially receiving the satellite navigation signals to produce differential corrections and integrity information; signal processing the received satellite navigation signals to produce pseudo ranges and rates and satellite velocity data information; and analyzing and combining all the received information to obtain an optimum position, course and speed determination.

4. A method as claimed in claim 1 and in which the further steps are performed of differentially receiving the satellite navigation signals to produce differential corrections and integrity information; signal processing the received satellite navigation signals to produce pseudo ranges and rates and satellite velocity data in-formation; deriving from the Loran-C received signals time-of-arrival pseudo range, pseudo range rate and integrity information; and analyzing and combining all the received information to obtain optimum position, course and speed determination.

5. A method as claimed in claim 1 and in which the satellite navigation signals with their precise accuracy are used to calibrate the grid of Loran-C signal stable gradients, with the use of the Loran-C precise change of position and velocity determination between satellite navigation signal fixes enabling the user reception through periods of satellite signal outages.

6. A method as claimed in claim 1 and in which the said Loran-C communication signals are provided by modulations upon the Loran-C radio navigation signal transmission.

7. A method as claimed in claim 6 and in which the said modulations are one or both of pulse position modulation and phase code flipping modulation serving as data bit representatives.

8. A method as claimed in claim 7 and in which pulse position modulation is employed and the offsets of the measured carrier phase of the Loran-C signal are effected by coding that provides an equal number of pulse position advance and retard bits.

9. Apparatus for integrating Loran-C navigation and communications signals and satellite navigation system radio navigation signals and augmentation data message signals, including one or more of satellite clock offset, orbital parameters propogation conditions and/or pseudo range corrections, for improving system accuracy, availability and integrity, said apparatus having, in combination, user ground receiver means for receiving satellite radio navigation signals and augmenting data message signals; at each such receiver means, Loran-C receiver means for receiving the Loran-C signals as a communications signal and a supplemental navigation signal, with means for smoothing the user positions and velocity data between the satellite signal augmentation data messages and between the added and deleted satellite communication available to the user receiver means position and velocity determination.

10. Apparatus as claimed in claim 9 and in which means is provided for using the precise accuracy received satellite navigation signals to calibrate the grid of received Loran-C signal stable gradients, and means for using the Loran-C precise change of position and velocity determination between satellite navigation signal fixes, enabling the user reception through periods of satellite signal outages.

11. Apparatus as claimed in claim 9 and in which means is provided for differentially correcting the user received satellite navigation signals to produce improved position, course, speed and integrity information; means for deriving from the Loran-C received signals a separate fix of position, course, speed and integrity information; and means for analyzing and combining all the received information to obtain optimum position, course and speed determination.

12. Apparatus as claimed in claim 9 and in which means is provided for differentially receiving the satellite navigation signals to produce to produce differential corrections and integrity information; means for signal processing the received satellite navigation signals to produce pseudo ranges and rates and satellite velocity data information; means for deriving from the Loran-C received signals time difference and integrity information; and means for analyzing and combining all the received information to obtain an optimum position, course and speed determination.

13. Apparatus as claimed in claim 9 and in which means is provided for differentially receiving the satellite navigation signals to produce differential corrections and integrity information; means for signal processing the received satellite navigation signals to produce pseudo ranges and rates and satellite velocity data information; means for deriving from the Loran-C received signals time-of-arrival pseudo range and rate and integrity information; and means for analyzing and combining all the received information to obtain optimum, position, course, and speed determination.

14. Apparatus as claimed in claim 9 and in which said Loran-C communication signal is effected as a modulation upon the Loran-C signals.

15. Apparatus as claimed in claim 14 and in which said Loran-C communication signal is provided by at least one of pulse position and phase code modulation serving as data bit representations.

* * * * *